Oct. 17, 1939.  A. G. SCHUESSLER ET AL  2,176,806
METHOD AND APPARATUS FOR CONTACTING IMMISCIBLE LIQUIDS
Filed Jan. 24, 1938
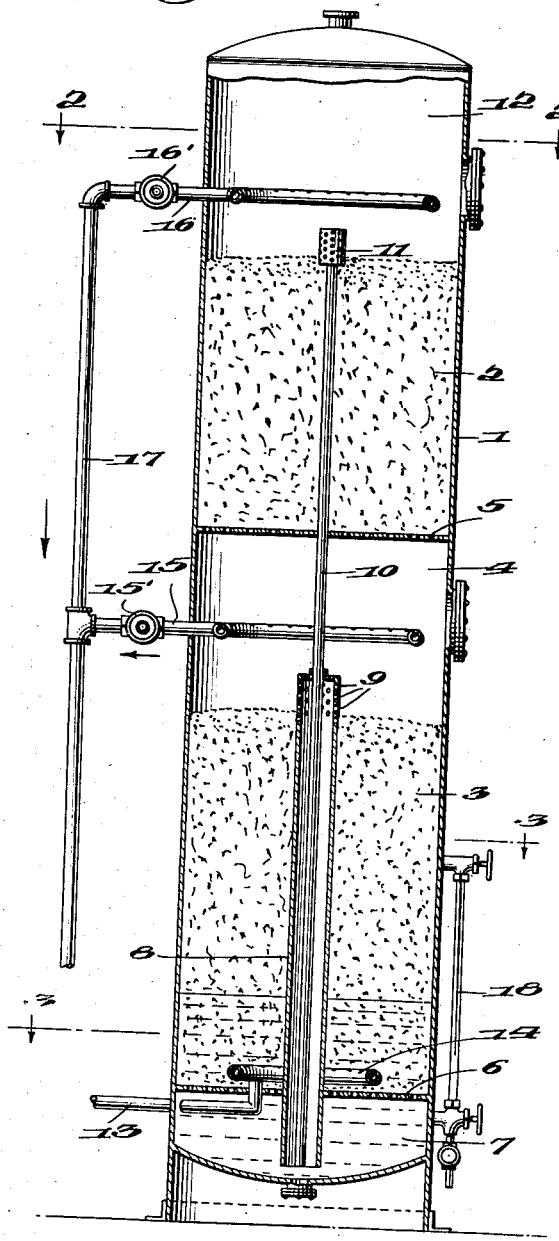
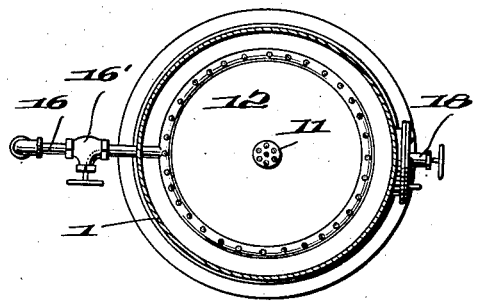
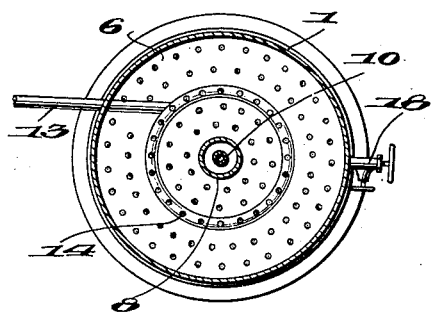
Inventors
A. G. Schuessler,
R. W. Leslie,
By
Attorneys Patented Oct. 17, 1939

2,176,806

UNITED STATES PATENT OFFICE 2,176,806

METHOD AND APPARATUS FOR CONTACTING IMMISCIBLE LIQUIDS

Albert G. Schuessler and Robert W. Leslie, El Dorado, Kans., assignors to Skelly Oil Company, Tulsa, Okla.

Application January 24, 1938, Serial No. 186,736

11 Claims. (Cl. 23—270)

Our invention consists in new and useful improvements in a method and apparatus for contacting immiscible liquids and has for its object to facilitate the intimate contacting of a fluid to be treated with a heavier treating fluid.

It is well known that in a great many industrial processes, one or more of the steps employed require the interaction between liquids of unlike character for the successful operation of such processes. In some it is desired to bring two immiscible or substantially immiscible liquids together for the purpose of effecting chemical reaction between constituents of the liquids, while in others, the interchange of solutes or suspended matter is the object. Another common operation comprises the absorption of one liquid in the other as a part of the process.

These operations have heretofore been carried out in a variety of ways, the simplest of which is probably the bubbling of the lighter liquid through a body of the heavier liquid. When introduced at the bottom of a treating tower, the light liquid is caused to ascend through the heavy liquid by the action of gravity, producing to some degree the reaction desired. However, for commercial purposes, this type of action is often slow and cumbersome. The bubbling fluid may gather in large drops and thus offer a small surface for reaction to take place, in which case large volumes of reactants must be circulated to effect a given action. Furthermore, this operation may result in the formation of troublesome froths or emulsions which do not separate in any reasonable time by gravity alone, and it is to be noted that the eventual complete separation of the fluids is a necessary corrolary to the successful operation of such a process.

It is also known in the art that the interaction between two liquids can be facilitated by placing in the zone of action inert solid materials having a large contact surface in comparison with their volume. However, the presence of these packing devices usually increases the tendency of the two liquids to form a froth which, as before stated, is troublesome in an operation of this nature.

It is therefore an object of our invention to provide a method and apparatus for intimately contacting immiscible liquids followed by a complete separation of the liquids by means of which the disadvantages inherent in processes heretofore known are overcome.

Another object of our invention is to provide a method and apparatus for the purpose set forth whereby two immiscible liquids are caused to ascend through a packed section in parallel flow as distinguished from countercurrent flow as heretofore employed in some instances.

A further object of our invention resides in the method of separating the liquids after contacting and the return of the heavier liquid for reuse, such separation and return being effected by gravity.

A still further object of our invention is to effect an intimate contacting of two immiscible liquids in an operation which depends for such contact upon a differential in resistance to flow between said two liquids, in a packed section.

While our method is suitable for use in connection with the contacting of various liquids, it is primarily adapted to the scrubbing with caustic soda of petroleum distillates such as gasoline, cracked gasoline, or kerosene, for removal of hydrogen sulphide. It will be understood that these liquids are selected for the purpose of illustration only and should not be construed as limiting the application of the invention in any way.

With the above and other objects in view which will appear as the description proceeds, our invention resides in the novel features hereinafter set forth, illustrated in the accompanying drawing and more particularly pointed out in the appended claims.

Referring to the drawing which illustrates one form of apparatus by means of which our method may be carried out, and wherein numerals of like character designate similar parts throughout the several views:

Fig. 1 is a vertical sectional view of a treating tank showing the packed sections and treating fluid return means.

Fig. 2 is a sectional view taken on line 2—2 of Fig. 1, and

Fig. 3 is another sectional view taken on line 3—3 of Fig. 1.

In the drawing, the numeral 1 represents a treating tower in the form of a vertical tank provided with upper and lower packed sections 2 and 3 with an unpacked separating area 4 interposed therebetween. The bottom of the upper packed section 2 is formed by a perforate plate 5 which defines the upper extremity of the unpacked area 4, a second perforated plate 6 forming the bottom of the lower packed section 3. The lower plate 6 is spaced a predetermined distance above the bottom of the tower to form a reservoir 7 for the treating fluid.

Centrally disposed in the lower portion of the tower and extending from the reservoir 7 into the unpacked area 4 is a tubular downcomer 8 open at its lower extremity into the reservoir 7 and provided at its upper extremity with a series of radiating apertures 9 opening into the unpacked area 4. A second downcomer 10 of smaller diameter is arranged coaxially with the downcomer 8 and extends from the reservoir 7 through the downcomer 8, the unpacked area 4 and the upper packed section 2, terminating at its upper end in a perforated head 11 which lies at the surface of the packing in the upper packed section 2, whereby the unpacked area 12 above the upper packed section is in communication with the reservoir 7.

In the lower portion of the tower 1, we provide an inlet pipe 13 having a distributor head 14 located in the lower extremity of the lower packed section 3. Discharge pipes 15 and 16 provided with valves 15' and 16', respectively, lead from the unpacked areas 4 and 12, respectively; suitable means being provided on the inner ends of said discharge pipes to facilitate the withdrawal of liquid therefrom as will hereinafter appear. The discharge pipes 15 and 16 terminate at their outer ends in communication with a common header or conduit 17 which leads to any suitable storage point not shown.

Each of the sections 2 and 3 is packed to a point just below the perforated upper end of its respective downcomer with any suitable packing means which is chemically inert and impervious to the fluids to be contacted, such for example as sand, gravel, or the like, and the reservoir 7 is filled with an alkali solution, for example, the level of which extends into the lower packed section 3 to a point definitely covering the distributor head 14. A gauge glass 18 may be provided for registering the level of the treating solution.

In the operation of our process, an oil distillate, or other liquid to be treated, is introduced through the inlet pipe 13 and enters the packed section 3 at a point below the level of the treating solution through the distributor head 14 which evenly discharges said distillate through the body of treating solution. As the distillate rises in contact with the packing, there is caused an intimate mixture of the two liquids, the alkali being carried upward through the packing due to a force which for lack of a better expression may be referred to as a surface tension effect. We have found that when the proper size of packing materials are used, which of course depends to a considerable extent upon the character of the liquids to be contacted, the action of the lighter liquid is such as to force bodies of the heavier liquid to travel upward in the form of "heads" between bodies of the lighter liquid. The "heads" offer an opportunity for the heavy liquid to bathe the contact surfaces with a fresh layer of contacting fluid and thus greatly facilitate the reaction between the liquids because of the extensive new surface provided in a continuous manner. The intimately mixed materials emerge from the packed section 3 into the unpacked area 4 where the mixture separates into its components and the excess alkali solution or treating liquid returns through the downcomer 8 to the reservoir 7. As heretofore stated, the action of the system is such that the distillate introduced through the distributor head 14 tends to lift the alkali in surges or "heads" and the alkali is carried upward with the distillate to emerge in the unpacked area. Thus, a back-pressure is set up by the rising surge or "head" of alkali which causes the level in the reservoir 7 to recede, the alkali rising in downcomer 8 until the back pressure is relieved by the emergence of the alkali surge in the unpacked area 4. When thus relieved, the alkali in the unpacked area 4 returns to the reservoir 7 partly through the downcomer 8 and partly through the packing, to join the ensuing surge or "head", when it repeats the cycle just described. The treated distillate, from which the alkali solution has been separated in the unpacked area 4, is withdrawn through discharge pipe 15, valve 15' and enters the conduit 17 from whence it goes to storage.

In the event there are traces of the heavy treating liquid still remaining in the distillate in the unpacked area 4, the valve 15' is closed, whereby the distillate and entrained alkali enter the packed section 2 through the perforations in the plate 5 and pass upwardly therethrough to the unpacked area 12 in the upper portion of the tower. The purpose of the packing material in section 2 is to offer an opportunity for the finely divided traces of treating agent to coalesce into larger drops or films which separate rapidly in the unpacked area 12. Here, any entrained alkali is trapped and returned to the main body of alkali in the reservoir 7 through the perforated head 11 and downcomer 10. The distillate, from which the treating solution has separated by gravity, is withdrawn through discharge pipe 16 and conduit 17. In many instances, this second packed section is unnecessary as the contacting and gravity separation is completed in the first section of the unit.

It will thus be apparent that we have provided an improved method and apparatus for intimately contacting immiscible liquids which may be carried out in a continuous operation with a concurrent flow of the contacting liquids, and a gravity separation and return of the treating solution to its source of supply for re-use.

We have found that as a natural consequence of the "heads" produced as hereinabove described, the heavy liquid volume at the bottom of the apparatus is semi-continuously depleted, and that in an efficient contacter, the flow rates are such that the heavy liquid does not have an opportunity to return to the bottom of the contacter against the flow of the lighter liquid unless there is provided some means such as our downcomers 8 and 10 for returning the headed heavy fluid to the bottom of the contacter where it is available for re-use.

Thus, by our present invention we have provided a simple and effective contacting method and apparatus for expediting the treatment of distillates, depending for contact upon a differential in resistance to flow between a comparatively light fluid to be treated, and a comparatively heavy treating solution, there being both free liquid to liquid, and liquid to film contact as the packing of the packed section is continuously bathed with treating solution, and by virtue of the return means, there is constantly available a supply of treating solution to facilitate a continuous operation.

From the foregoing it is believed that the operation and advantages of our invention may be readily understood by those skilled in the art without further description, it being borne in mind that numerous changes may be made in the details disclosed without departing from the spirit of our invention as set out in the following claims.

What we claim and desire to secure by Letters Patent is:

1. The method of treating a liquid with a heavier immiscible treating solution, which consists in maintaining a substantially constant body of treating solution in a vessel, introducing a stream of said liquid into and below the upper level of said body of solution, passing said liquid through a packed zone, a portion of which extends into said body, whereby portions of said solution are carried concurrently with said liquid through said packed zone to intimately contact the two, separating the mixture into its components in an unpacked zone, withdrawing the treated liquid, and returning the separated solution to said body out of contact with the liquid being treated.

2. The method of treating a liquid with a heavier immiscible treating solution, which consists in maintaining a substantially constant body of treating solution in a vessel, continuously introducing a stream of said liquid into and below the upper level of said body of said solution, which level extends into a packed zone, intimately contacting said liquid and solution by passing said liquid upwardly through said packed zone, whereby the action of said liquid due to a surface tension effect, forces bodies of said solution to travel upwardly in the form of heads between bodies of said solution, separating the mixture into its components in an unpacked zone, withdrawing the treated liquid, and returning the separated solution to said body out of contact with the liquid being treated.

3. The method of treating a liquid with a heavier immiscible treating solution, which consists in maintaining a substantially constant body of treating solution in a vessel, introducing a stream of said liquid into and below the upper level of said body of solution, passing said liquid through a packed zone, a portion of which extends into said body, whereby portions of said solution are carried concurrently with said liquid through said packed zone to intimately contact the two, separating the mixture by gravity into its components in an unpacked zone, withdrawing the treated liquid, and returning the separated solution to said body out of contact with the liquid being treated.

4. The method of treating a liquid with a heavier immiscible treating solution, which consists in maintaining a substantially constant body of treating solution in a vessel, introducing a stream of said liquid into and below the upper level of said body of solution, passing said liquid through a packed zone, a portion of which extends into said body, whereby portions of said solution are carried concurrently with said liquid through said packed zone to intimately contact the two, primarily separating the mixture in an unpacked zone, returning the separated solution to said body out of contact with the liquid being treated, passing the remainder of said mixture through a second packed zone, finally separating the mixture into its components, withdrawing the treated liquid, and returning the finally separated solution to said body out of contact with the liquid being treated.

5. In apparatus for treating immiscible liquids comprising a tank having a packed section, a reservoir for maintaining a substantially constant supply of treating liquid below said packed section with the upper level of said liquid extending into the lower portion of said packed section, an unpacked separating chamber above said packed section, an inlet conduit leading into said tank at a point below the upper level of said treating liquid for introducing a stream of the liquid to be treated, said packed section extending to a point above said inlet, means for withdrawing the treated liquid from said separating chamber, and means for returning the separated treating liquid from said separating chamber to said reservoir out of contact with the liquid being treated.

6. In apparatus for treating immiscible liquids comprising a tank having a packed section, means for maintaining a substantially constant body of treating liquid below said packed section with the upper level of said body extending into the lower portion of said packed section, an unpacked separating chamber above said packed section, an inlet conduit leading into said tank at a point below the upper level of said body of liquid for introducing a stream of the liquid to be treated, said packed section extending to a point above said inlet, means for withdrawing the treated liquid from said separating chamber, and a return conduit leading from the lower portion of said separating chamber to said body of liquid.

7. In apparatus for treating immiscible liquids comprising a tank having a packed section, means for maintaining a substantially constant body of treating liquid below said packed section with the upper level of said body extending into the lower portion of said packed section, an unpacked primary separating chamber above said packed section, an inlet conduit leading into said tank at a point below the upper level of said body of liquid for introducing a stream of the liquid to be treated, said packed section extending to a point above said inlet, means for returning the separated treating liquid to said body of liquid out of contact with the liquid being treated, a second packed section above said primary separating chamber, an unpacked final separating chamber above said second packed section, means for withdrawing the treated liquid from said final separating chamber, and means for returning the finally separated treating liquid to said body of liquid out of contact with the liquid being treated.

8. Apparatus as claimed in claim 7 wherein the means for returning separated treating liquid from said primary and final separating chambers comprises return conduits leading to said body of liquid.

9. Apparatus as claimed in claim 5 including a distributor head on said inlet conduit.

10. The method of treating a liquid with a heavier immiscible treating solution which consists in maintaining a substantially constant body of treating solution in a vessel, introducing a stream of said liquid into a packed zone and into and below the upper level of said body of treating solution which extends into the lower portion of said packed zone, passing said liquid through said packed zone, whereby portions of said solution are carried concurrently therewith to intimately contact the two, separating the mixture into its components in an unpacked zone, withdrawing the treated liquid, and returning the separated solution to said body out of contact with the liquid being treated.

11. In apparatus for treating immiscible liquids comprising a tank having a packed section, a reservoir for maintaining a substantially constant supply of treating liquid below said packed section with the upper level of said liquid extending into the lower portion of said packed section, an unpacked separating chamber above said packed section, an inlet conduit leading into said packed section at a point below the upper level of said treating liquid for introducing a stream of the liquid to be treated, said packed section extending to a point above said inlet, means for withdrawing the treated liquid from said separating chamber, and means for returning the separated treating liquid from said separating chamber to said reservoir out of contact with the liquid being treated.

ALBERT G. SCHUESSLER.
ROBERT W. LESLIE.